United States Patent [19]

Tokunaga et al.

[11] Patent Number: 4,566,048
[45] Date of Patent: Jan. 21, 1986

[54] TAPE CASSETTE ADAPTER

[75] Inventors: Tomokazu Tokunaga, Neyagawa; Masataka Izaki, Yawata; Jirou Kajino, Neyagawa; Toshibumi Kamiyama, Tsuyama, all of Japan

[73] Assignee: Matsushita Electric Industrial Co., Ltd., Osaka, Japan

[21] Appl. No.: 423,212

[22] Filed: Sep. 24, 1982

[30] Foreign Application Priority Data

Sep. 26, 1981 [JP] Japan ................................ 56-152748
Oct. 23, 1981 [JP] Japan ................................ 56-170379

[51] Int. Cl.⁴ ........................ G11B 15/32; G03B 1/04
[52] U.S. Cl. ...................................... 360/94; 242/200
[58] Field of Search ...................... 360/94, 85, 132; 242/198-200

[56] References Cited

U.S. PATENT DOCUMENTS 4,432,510  2/1984  Ogata ............................... 360/94 X

FOREIGN PATENT DOCUMENTS 55-45172  3/1980  Japan ................................... 360/94

Primary Examiner—A. J. Heinz
Attorney, Agent, or Firm—Wenderoth, Lind & Ponack

[57] ABSTRACT

A tape cassette adapter has a compact cassette, the magnetic tape of which is drawn out of the compact cassette by the movement of a tape drawing member from an inoperative position to an operative position due to movement in a single direction by a slide member. The tape is wound back onto a take-up reel of the compact cassette by a rotating member due to movement of the slide member in the reverse direction, while the tape drawing member returns from the operative position to the inoperative position.

8 Claims, 4 Drawing Figures

TAPE CASSETTE ADAPTER

BACKGROUND OF THE INVENTION

1. Field of the Invention

This invention relates to a tape cassette adapter and more particularly to a tape cassette adapter which is useful for a tape recording and/or reproducing apparatus such as an audio tape cassette recorder and a video tape cassette recorder.

2. Description of the Prior Art

It is known that there are standard size magnetic tape cassette apparatuses which are adaptable to a standard size tape cassette with a long length tape for long recording and reproducing, and that there are small size magnetic tape apparatuses which are adaptable to a small or compact tape cassette with a short length tape and which are useful for out-door recording due to small size and light weight. These apparatuses may be used selectively depending on needs or purposes.

However, there are differences in the size of components and in the arrangement of the components between these two types of magnetic tape apparatuses, due to the difference in the distances between the centers of the respective pairs of reel drive shafts. The center distance between the pair of reel drive shafts must be the same as the distance between the pair of reels in the magnetic tape cassette. Thus, it is not possible to use a compact tape cassette in a conventional standard size magnetic tape apparatus, or vice versa.

SUMMARY OF THE INVENTION

It is therefore an object of the present invention to provide a tape cassette adapter with which a compact size magnetic tape cassette (hereinafter called a compact tape cassette) can be adapted for use with a standard size magnetic tape cassette apparatus.

Another object of the present invention is to provide an improved tape cassette adapter having a mechanism for drawing reliablly the magnetic tape out of the compact tape cassette.

Still another object of the present invention is to provide an improved tape cassette adapter having a slip mechanism for preventing the tape from being excessively tensioned when it is drawn back into the cassette.

Yet another object of the present invention is to provide an improved tape cassette adapter having a mechanism for preventing the tape from slackening when it is drawn out of the cassette.

A further object of the present invention is to provide an improved tape cassette adapter having a mechanism for locating and setting up a tape guide member so as to stabilize the tape running system.

These objects are achieved according to the present invention by providing a tape cassette adapter including a body or member having: a recess for receiving a compact tape cassette which has a shorter length tape, smaller size and lighter weight than a standard size tape cassette, a take-up reel and a supply reel on which the magnetic tape is wound, and a cut away portion through which the magnetic tape may be moved or drawn outwardly of the cassette. A tape drawing means is movable between an inoperative position disposed at the cut away portion and an operative position to draw the magnetic tape out of the compact tape cassette such that the tape follows a path almost as same as that of a standard tape cassette. A reel rotating means winds the drawn tape back onto the take-up reel of the compact tape cassette. A slide member drives the tape drawing means and the reel rotating means by a reciprocal sliding motion in the longitudinal direction of the tape cassette adapter.

The manner in which the foregoing and other objects of this invention are accomplished will be apparent from the accompanying specification and claims considered together with the drawings, wherein:

DETAILED DESCRIPTION OF THE PREFERRED EMBODIMENTS

Figure 1:
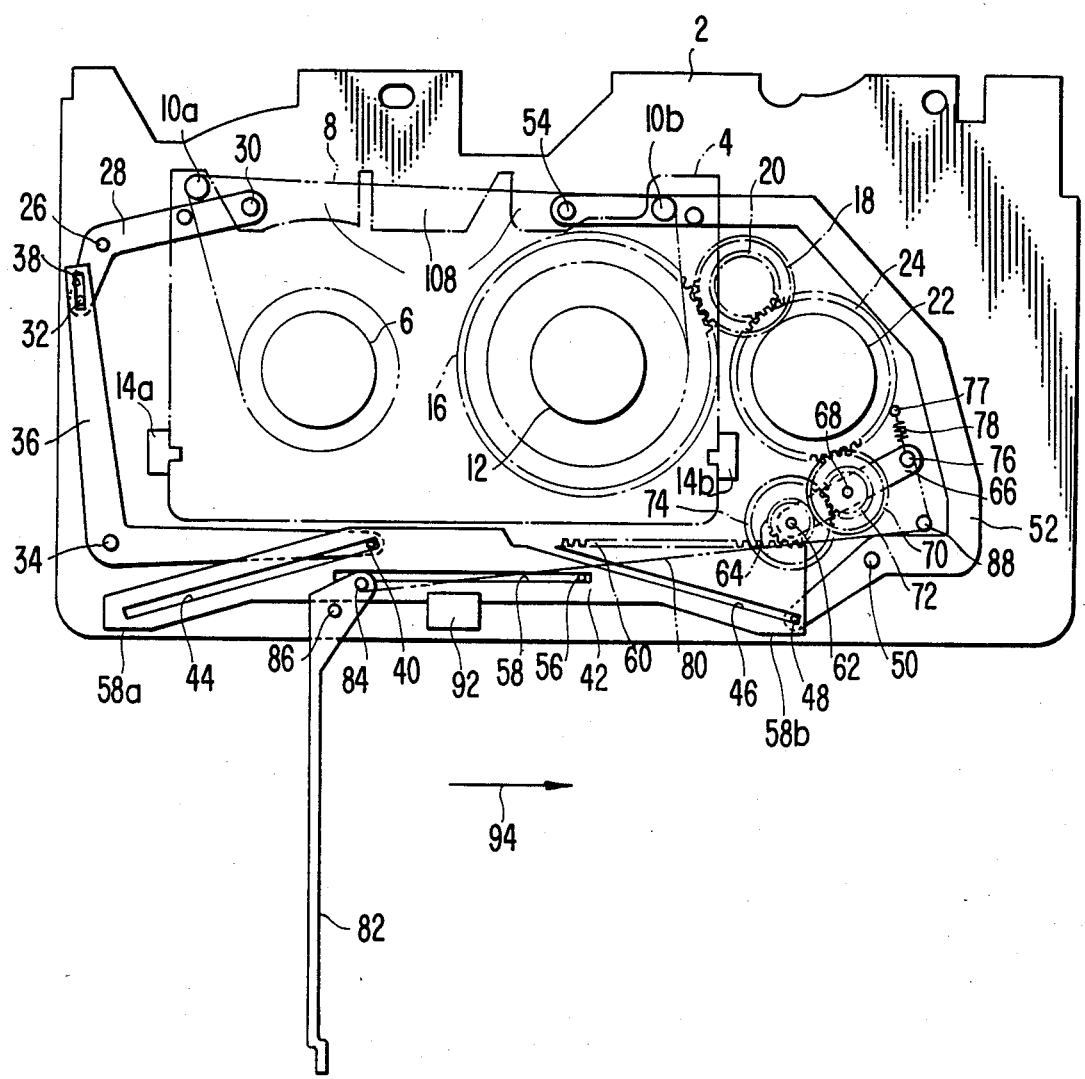
FIG. 1 is a schematic plan view of a tape casssette adapter according to this invention, and illustrating the relative position of a compact tape cassette, in dot-dash lines, which is positioned in the adapter.

Referring now to the drawings, embodiments of a tape cassette adapter according to the present invention will be described in detail hereinafter.

Referring to FIG. 1, a compact tape cassette 4 is set on a chassis 2 as shown in dot-dash lines. The compact tape cassette 4 includes a magnetic tape 8 wound on and extending between a supply reel 6 and a take-up reel 12 which are rotatably mounted in the cassette. The compact tape cassette 4 has a cut-away portion 108 through which the magnetic tape 8 is exported outwards drawn outwardly of the cassette. A gear 16 provided on the take-up reel 12 of the compact tape cassette 4 is connected to a gear 24 provided on a take-up drive wheel 22, through an idle gear 18 and an idle gear 20. The take-up drive wheel 22 rotatably mounted on the chassis 2 is engaged with a take up reel drive turntable (not shown) of a standard size magnetic tape apparatus so that they rotate synchronously with each other.

One end of a first tape loading arm 28 rotatably mounted on a shaft 26 has a first tape guide pole or pin 30 secured thereto, and the other end has a drive pin 32 secured thereto. The first tape guide pole 30 draws the magnetic tape 8 out of the compact cassette 4 by counterclockwise pivoting of the first tape loading arm 28. One end of a middle arm 36 rotatably mounted on a shaft 34 has a slot 38 in which the drive pin 32 is inserted. The other end of the arm 36 has a drive pin 40 secured thereto. The drive pin 40 is inserted into a first cam groove 44 provided on an operation rod 42. Additionally, the operation rod 42 has a second cam groove 46. A second tape loading arm 52 is rotatably mounted on a shaft 50. One end of the second tape loading arm 52 has a drive pin 48 secured thereto, and the drive pin 48 is inserted in the second cam groove 46. The other end of the arm 52 has a second tape guide pole or pin 54 secured thereto. The second tape guide pole 54 draws the magnetic tape 8 out of the compact tape cassette 4 by clockwise pivoting of the second tape loading arm 52.

Figure 2:
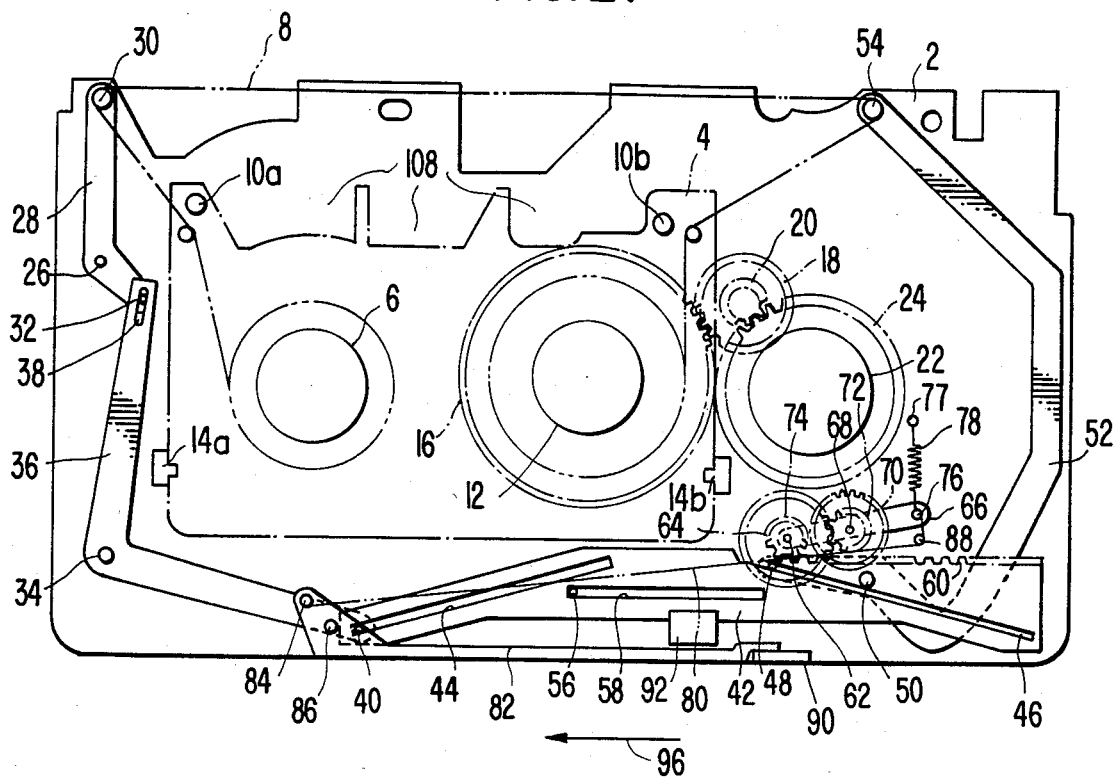
FIG. 2 is a schematic plan view of a tape cassette adapter with a compact tape cassette, showing the magnetic tape position after the magnetic tape is drawn out of the compact tape cassette.

The operation rod 42 is slidably mounted on the chassis 2 by guide means comprising side edges 58a, 58b and a guide slot 58 in which a guide pin 56 is inserted, and moves between an inoperative position shown in FIG. 1 and an operative position shown in FIG. 2. The operation rod 42 is provided with a rack 60. The rack 60 engages with a gear 64 which is rotatably mounted on the chassis 2 by a shaft 62. A gear 70 is rotatably mounted on a shaft 68 secured on a swing arm 66 to be moved into engagement with the gear 24 (FIG. 1). The gear 70 is rotated by a gear 72 through a one way clutch (not shown). The gear 72 engages with a gear 74 coaxially connected to the gear 64 through a suitable friction means (not shown).

The swing arm 66 is urged counterclockwise by a spring 78 connected between a pole or pin 76 provided on the swing arm 66 and a shaft 77 fixed on the chassis 2. A connecting wire 80 is connected between the pole 76 and a pin 84 fixed on a cover 82 through a wire-guide pole 88. The cover 82 is rotatably mounted on a shaft 86 fixed on the chassis 2. While the cover 82 is at the inoperative position as shown in FIG. 1, the gear 70 engages with the gear 24 and the connecting wire 80 is slightly slackened. While the cover 82 is at the operative position as shown in FIG. 2, the connecting wire 80 is tightened so as to move the gear 70 to disengage from the gear 24.

The operation and the motion of the tape cassette adapter according to the present invention will be described hereinafter.

As shown in FIG. 1, the compact tape cassette 4 is inserted in the cassette receiving space in the chassis. At this time, the position of the compact tape cassette 4 is decided by positioning blocks 14a, 14b. With the cover 82 in the inoperative position as shown in FIG. 1, the drive pin 40 which is inserted in the first cam groove 44 provided in the operation rod 42 is driven by sliding motion of an operation knob 92 in the direction of the arrow 94, the longitudical direction of the tape cassette adapter. Consequently, the middle arm 36 is pivoted clockwise and the first tape loading arm 28 is pivoted counterclockwise to draw the magnetic tape 8 out of the compact tape cassette 4 by the first tape guide pole 30 as shown in FIG. 2. At the same time, the drive pin 48 inserted in the second cam groove 46 is moved, and consequently, the second tape loading arm 52 is pivoted clockwise to draw the magnetic tape 8 out of the compact tape cassette 4 by the second tape guide pole 54. Thus, the magnetic tape 8 is brought into a desirable tape path on which signals can be recorded and reproduced by a standard size magnetic tape apparatus. Thereafter, the swing arm 66 connected to the cover 82 through the connecting wire 80 is turned clockwise, and the gear 70 is disengaged from the gear 24, by counterclockwise pivoting of the cover 82 which can be locked at a closed position by lock means 90 as shown in FIG. 2. The tape cassette adapter with the compact tape cassette 4 in the condition shown in FIG. 2 can be installed in a standard size magnetic tape apparatus, because the outline of its size and the tape path are almost as same as those of a standard tape cassette. Additionally, stable recording and reproducing signals are achieved on the magnetic tape because the gear 70 is disengaged from the gear 24, so the take-up reel drive wheel 22 which is connected to the take-up reel drive turntable of the apparatus is not subjected to unnecessary loads.

Next will be described a tape unloading operation in which the drawn magnetic tape 8 as shown in FIG. 2 again is wound on the take-up reel 12 of the compact tape cassette 4 without slackening.

The cover 82 is released from the locking block 90 by sliding the locking block 90 and is opened clockwise to the condition as shown in FIG. 1. At this time, the swing arm 66 is turned counterclockwise by the spring 78 until the gear 70 provided on the arm 66 engages with the gear 24, because the connecting wire 80 connected between the pole 76 and a pin 84 fixed on one end of the cover 82 is slackened.

The operation rod 42 is moved in the direction of the arrow 96, in the longitudinal direction of the tape cassette adapter, by pulling the operation knob 92 in the direction of the arrow 96. At this time, the first tape loading arm 28 is pivoted clockwise by the first cam groove 44, and the second tape loading arm 52 is pivoted counterclockwise by the second cam groove 46, to the position shown in FIG. 1. The rack 60 is also moved in the direction of the arrow 96. The gear 24 provided on the take-up reel drive wheel 22 rotates clockwise through the gears 70, 72, 74 because the gear 64 is rotated clockwise by the rack 60, and the gear 16 rotates clockwise through the idle gears 18, 20. Consequently, the previously pulled out of drawn magnetic tape 8 is wound back on the take-up reel 12 of the compact tape cassette 4. The amount of rotation of the gear 64 is designed to be greater than the amount of rotation necessary for taking-up the drawn magnetic tape 8 as shown in FIG. 2. But excessive tension does not occur on the magnetic tape 8 because of a friction means which is provided between the gear 64 and the gear 74. Consequently, the drawn magnetic tape 8 is wound onto the take-up reel 12 of the compact tape cassette 4 without slack.

Figure 4:
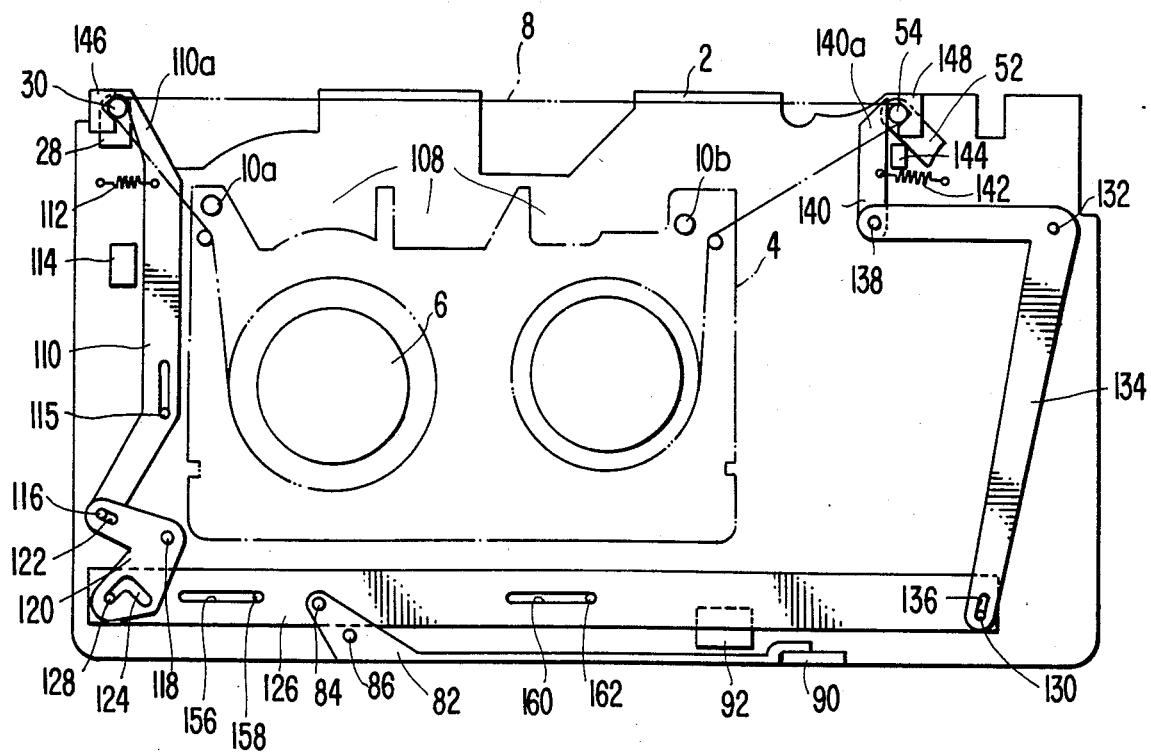
FIG. 4 is a schematic plan view of a location and set up mechanism at its finally set up position.
Figure 3:
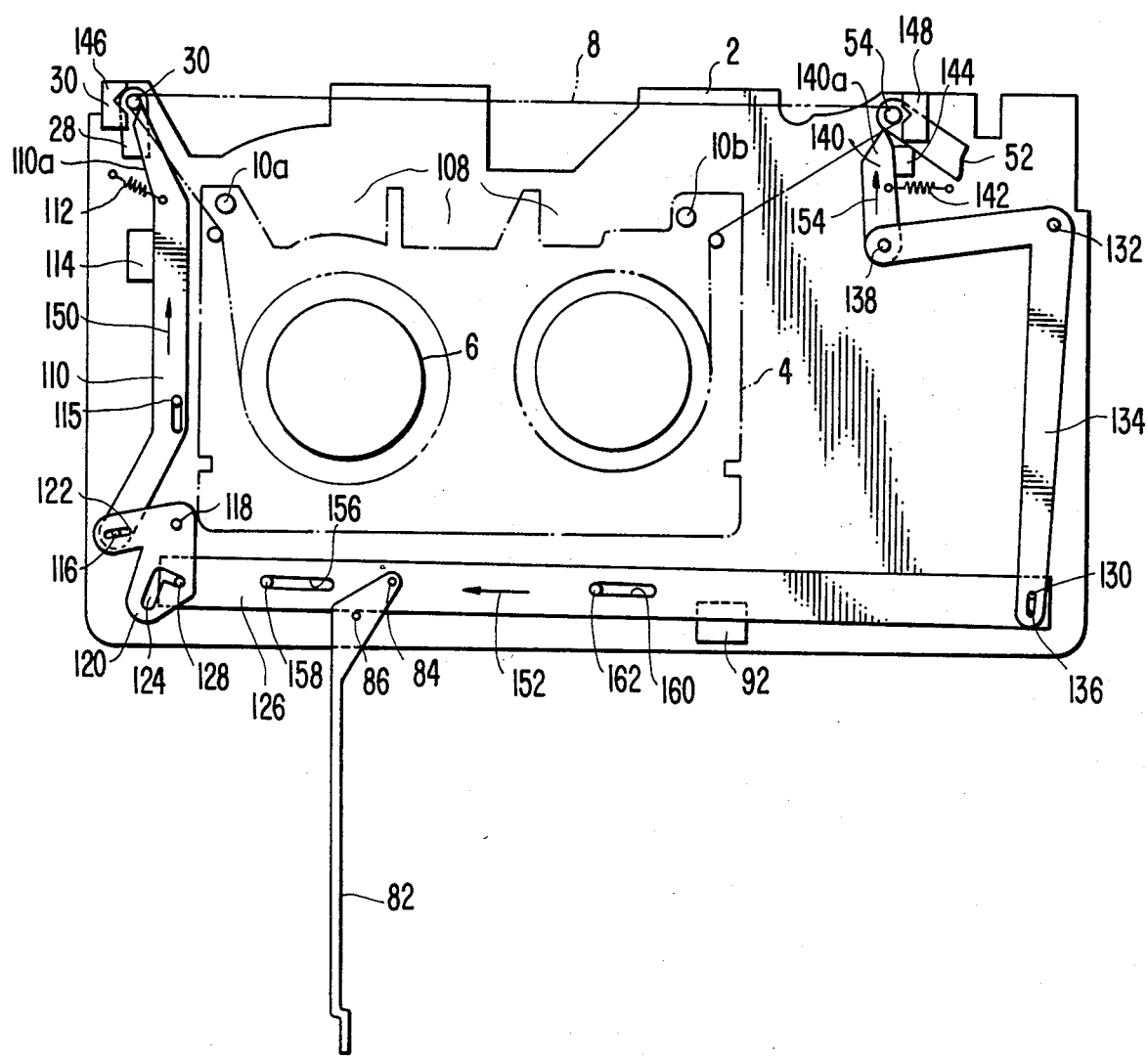
FIG. 3 is a schematic plan view of a location and set-up mechanism according to this invention, and illustrating the relative position of a compact tape cassette.

Referring to FIGS. 3 and 4, there now will be described a location and set up mechanism for stabilizing a tape running system. A first pushing lever 110 rotatably and slidably mounted on a shaft 115 is urged counterclockwise by a spring 112, and this rotation is limited by a stopper 114 to establish a specified location of lever 110. A drive pin 116 provided on one end of the first pushing lever 110 is inserted into a slot 122 in a middle arm 120 which is rotatably mounted on a shaft 118. The middle arm 120 has a cam groove 124 into which a shaft 128 provided on one end of a slide lever 126 is inserted. The other end of the slide lever 126 has a shaft 130 which is inserted into a slot 136 of one end of a middle arm 134 which is rotatably mounted on a shaft 132. A second pushing lever 140 is rotatably mounted on a shaft 138 provided on the other end of the middle arm 134. The second pushing lever 140 is urged clockwise by a spring 142, and this rotation is limited by a stopper 144 to establish a specified location lever 140. The slide lever 126 is guided by guide pins 162, 158 extending into respective slots 160, 156 inserted and lever 126 is mounted on pin 84 provided on the cover 82.

While the magnetic tape 8 is drawn out and the cover 82 is at the inoperative position as shown in FIG. 3, noses or projections 110a, 140a of the first pushing lever 110 and the second pushing lever 140 do not contact respective tape guide poles 30, 54. When the cover 82 is moved from the inoperative position as shown in FIG. 3 to the operative position as shown in FIG. 4, the first pushing lever 110 moves in the direction of an arrow 150, and the second pushing lever 140 moves in the direction of an arrow 154, due to the movement of the slide lever 126 in the direction of an arrow 152.

As shown in FIG. 4, the tape guide poles 30, 54 are located by respective location members 146, 148, and are held thereagainst by the pushing arms 110, 140. Consequently, the tape guide poles 30, 54 are perpendicular to a reference plane such as the plane of chassis 2, thereby stabilizing the tape running system.

What is claimed is:

1. A tape cassette adapter for enabling a compact tape cassette to be used in a standard size magnetic tape recording and/or reproducing apparatus, said adapter comprising:

a chassis having therein a recess for receiving a compact tape cassette which includes a shorter length tape, a smaller size and a lighter weight than a standard size tape cassette, a take-up reel and a supply reel on which the tape is wound, and a cut-away portion through which the tape may be drawn outwardly of the cassette;

tape drawing means, mounted on said chassis and movable between an inoperative position disposed at the cut-away portion and an operative position spaced outwardly of the cut-away portion, for drawing the tape through the cut-away portion from the compact tape cassette such that the path of the tape substantially is the same as that of a standard tape cassette;

reel rotating means, mounted on said chassis, for winding back onto the take-up reel of the compact tape cassette that length of the tape previously drawn from the cassette by said tape drawing means;

a slide member mounted on said chassis for reciprocal sliding movement in opposite directions longitudinally of said chassis;

means connecting said slide member to said tape drawing means for transmitting longitudinal reciprocal movement of said slide member into movement of said tape drawing means between said inoperative and operative positions thereof;

means connecting said slide member to said reel rotating means for operating said reel rotating means only upon sliding movement of said slide member in a respective said longitudinal direction which causes said tape drawing means to move from said operative position thereof to said inoperative position thereof, said means connecting said slide member to said reel rotating means comprising at least first and second gears connected by a one way clutch, means for transducing sliding movement of said slide member to rotation of said first gear, said transducing means comprising a rack on said slide member, and a pinion mounted for engagement with said rack and said first gear, and said second gear being engageable with said reel rotating means; and disengagement means for selectively separating connection between said slide member and said reel rotating means.

2. An adapter as claimed in claim 1, wherein said disengagement means comprises a swing arm supporting said second gear and mounted for movement between a first position whereat said second gear engages said reel rotating means and a second position whereat said second gear is disengaged from said reel rotating means.

3. An adapter as claimed in claim 2, wherein said disengagement means further comprises spring means urging said swing arm toward said first position, a pivotally mounted lever, and means connecting said lever and said swing arm such that pivotal movement of said lever moves said swing arm against said spring means to said second position.

4. An adapter as claimed in claim 1, wherein said reel rotating means comprises a take-up drive wheel adapted to be rotated by a reel drive of a standard size magnetic tape apparatus, and a gear mounted on said drive wheel and adapted to rotate a gear mounted on the take-up reel of the compact tape cassette.

5. An adapter as claimed in claim 1, wherein said tape drawing means includes at least one tape guide pole, and further comprising means for fixing the position of said guide pole when said tape drawing means is at said operative position.

6. A tape cassette adapter for enabling a compact tape cassette to be used in a standard size magnetic tape recording and/or reproducing apparatus, said adapter comprising:

a chassis having therein a recess for receiving a compact tape cassette which includes a shorter length tape, a smaller size and a lighter weight than a standard size tape cassette, a take-up reel and a supply reel on which the tape is wound, and a cut-away portion through which the tape may be drawn outwardly of the cassette;

tape drawing means, mounted on said chassis and movable between an inoperative position disposed at the cut-away portion and an operative position spaced outwardly of the cut-away portion, for drawing the tape through the cut-away portion from the compact tape cassette such that the path of the tape substantially is the same as that of a standard tape cassette;

reel rotating means, mounted on said chassis, for winding back onto the take-up reel of the compact tape cassette that length of the tape previously drawn from the cassette by said tape drawing means;

a slide member mounted on said chassis for reciprocal sliding movement in opposite directions longitudinally of said chassis;

means connecting said slide member to said tape drawing means for transmitting longitudinal reciprocal movement of said slide member into movement of said tape drawing means between said inoperative and operative positions thereof;

means connecting said slide member to said reel rotating means for operating said reel rotating means only upon sliding movement of said slide member in a respective said longitudinal direction which causes said tape drawing means to move from said operative position thereof to said inoperative position thereof, said means connecting said slide member to said reel rotating means comprises at least first and second gears connected by a one way clutch, means for transducing sliding movement of said slide member to rotation of said first gear, and said second gear being engageable with said reel rotating means; and disengagement means for selectively separating connection between said slide member and said reel rotating means, said disengagement means comprising a swing arm supporting said second gear and mounted for movement between a first position whereat said second gear engaged said reel rotating means and a second position whereat said second gear is disengaged from said reel rotating means.

7. An adapter as claimed in claim 6, wherein said disengagement means further comprises spring means urging said swing arm toward said first position, a pivotally mounted lever, and means connecting said lever and said swing arm such that pivotal movement of said lever moves said swing arm against said spring means to said second position.

8. A tape cassette adapter for enabling a compact tape cassette to be used in a standard size magnetic tape recording and/or reproducing apparatus, said adapter comprising:
- a chassis having therein a recess for receiving a compact tape cassette which includes a shorter length tape, a smaller size and a lighter weight than a standard size tape cassette, a take-up reel and a supply reel on which the tape is wound, and a cut-away portion through which the tape may be drawn outwardly of the cassette;
- tape drawing means, mounted on said chassis and movable between an inoperative position disposed at the cut-away portion and an operative position spaced outwardly of the cut-away portion, for drawing the tape through the cut-away portion from the compact tape cassette such that the path of the tape substantially is the same as that of a standard tape cassette;
- reel rotating means, mounted on said chassis, for winding back onto the take-up reel of the compact tape cassette that length of the tape previously drawn from the cassette by said tape drawing means;
- a slide member mounted on said chassis for reciprocal sliding movement in opposite directions longitudinally of said chassis;
- means connecting said slide member to said tape drawing means for transmitting longitudinal reciprocal movement of said slide member into movement of said tape drawing means between said inoperative and operative positions thereof, said means connecting said slide member to said tape drawing means comprising at least one cam groove in said slide member, and at least one pin of said tape drawing means extending into said cam groove;
- means connecting said slide member to said reel rotating means for operating said reel rotating means only upon sliding movement of said slide member in a respective said longitudinal direction which causes said tape drawing means to move from said operative position thereof to said inoperative position thereof; and
- disengagement means for selectively separating connection between said slide member and said reel rotating means.

* * * * *